(12) United States Patent
Schaefer

(10) Patent No.: US 8,121,272 B2
(45) Date of Patent: Feb. 21, 2012

(54) ADAPTER FOR SWITCHING A TELECOMMUNICATION TERMINAL, USES AND METHOD

(75) Inventor: Stefan Schaefer, Kelkheim (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1349 days.

(21) Appl. No.: 11/665,241

(22) PCT Filed: Sep. 9, 2005

(86) PCT No.: PCT/EP2005/054480
§ 371 (c)(1),
(2), (4) Date: Apr. 12, 2007

(87) PCT Pub. No.: WO2006/040228
PCT Pub. Date: Apr. 20, 2006

(65) Prior Publication Data
US 2009/0122809 A1    May 14, 2009

(30) Foreign Application Priority Data
Oct. 12, 2004  (DE) .................... 10 2004 049 692

(51) Int. Cl.
*H04M 11/00* (2006.01)

(52) U.S. Cl. ............... 379/93.09; 379/93.05; 379/93.01
(58) Field of Classification Search ............ 379/93.09, 379/90.01, 93.05, 93.06, 93.11, 88.17; 370/356, 370/400, 352, 395.2
See application file for complete search history.

(56) References Cited

U.S. PATENT DOCUMENTS

| | | | |
|---|---|---|---|
| 3,803,360 A | 4/1974 | Morstadt | |
| 5,408,525 A * | 4/1995 | Eldering | 379/162 |
| 5,590,185 A | 12/1996 | Sandler et al. | |
| 2003/0002637 A1 * | 1/2003 | Miyauchi et al. | 379/93.01 |
| 2003/0169860 A1 * | 9/2003 | Chou | 379/88.17 |
| 2005/0152347 A1 * | 7/2005 | Chen et al. | 370/356 |

FOREIGN PATENT DOCUMENTS

| | | |
|---|---|---|
| DE | 69527747 | 4/2003 |
| EP | 0 684 722 A2 | 11/1995 |
| FR | 2 622 380 A1 | 4/1989 |

* cited by examiner

*Primary Examiner* — Melur Ramakrishnaiah
(74) *Attorney, Agent, or Firm* — Laurence A. Greenberg; Werner H. Stemer; Ralph E. Locher

(57) ABSTRACT

In one aspect, a device is provided. The device comprises at least one detection unit which generates an output signal in accordance with a status of a transmission path. Accordingly, switching of a telephone between two transmission paths is controlled in a simple manner in accordance with the output signal.

17 Claims, 1 Drawing Sheet

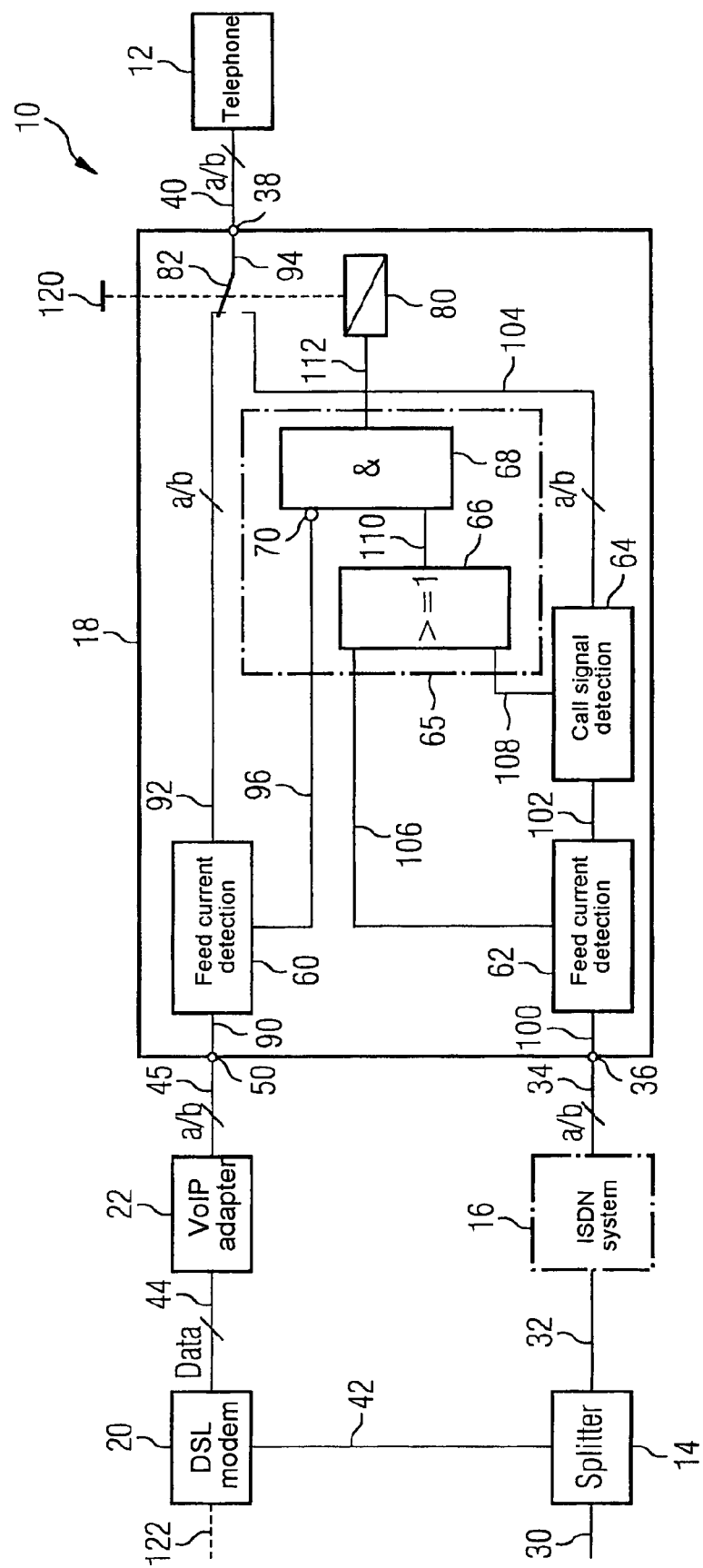

ADAPTER FOR SWITCHING A TELECOMMUNICATION TERMINAL, USES AND METHOD

CROSS REFERENCE TO RELATED APPLICATIONS

This application is the US National Stage of International Application No. PCT/EP2005/054480, filed Sep. 9, 2005 and claims the benefit thereof. The International Application claims the benefits of German application No. 102004049692.7 DE filed Oct. 12, 2004, both of the applications are incorporated by reference herein in their entirety.

FIELD OF INVENTION

The present invention relates to an adapter for switching a telecommunication terminal, uses and method.

BACKGROUND OF INVENTION

There exist several possibilities for a user to use two connections for one type of terminal, for example by manual unplugging and replugging of a terminal or by using a plurality of terminals which for example are constructed identical to each other. The terminals are, for example, telephones, in particular the popular analog telephones. However the terminal may also be a processor or computer.

Narrow band connections for example with transmission rates of less than or equal to 64 kilobits/second or less than or equal to 128 kilobits/second are one type of connection. The narrow band connections are, in particular, connections of a line-switched network in which voice channels are line-switched on a lower protocol level. Broadband connections for example, i.e. connections for a transmission rate of more than 1 Mbit/s (megabit/second) constitute a further type of connection. Such broadband connections are based for example on a normal POTS connection (Plain Old Telecommunication System) or ISDN connection (Integrated Services Digital Network). Some service providers, for example internet providers, offer real-time voice transmission via the internet for example, which is also called VoIP (Voice over Internet Protocol). These voice transmission services are in turn based on broadband connections. Broadband connections are in particular connections to a data packet transmission network in which the data packets are routed on a lower protocol level using address data in the data packet.

SUMMARY OF INVENTION

Converters inter alia which allow an analog telephone to be connected are used for utilization of a VoIP service, so the VoIP service may be used with this telephone. The VoIP user can therefore continue to use his telephone or telecommunications unit previously used in a line-switched network and still benefit from the advantages of IP telephony, in particular charging according to local call rates when conducting VoIP long distance calls. Since an analog telephone can only be operated at one connection respectively, however, use of the conventional POTS or ISDN connection is not possible without unplugging and replugging. Without a second analog telephone simultaneous availability from both systems is not possible either.

However similar problems also occur with other applications or other terminals with respect to the use of two connections for the same type of terminal.

An object of the invention is to disclose a simply constructed device which allows user-friendly operation of a terminal at two connections, in particular operation of an analog telephone at two analog interfaces, with one interface preferably being part of a telephone user connection and the second interface being part of an internet connection which is used for internet telephony. An associated method shall also be disclosed.

The object is achieved by the features disclosed in independent claim. Developments are disclosed in the dependent claims.

The device according to the invention is provided:

with a switchover unit which has a control input, a first switching input, a second switching input and a switching output and which optionally switches an electrically conductive connection between the first switching input and the switching output or between the second switching input and the switching output as a function of a signal at the control input, with a first connecting path which is used for connecting a first transmission path between the device and a transmission network and is connected to the first switching input, with a second connection path which is used for connecting a second transmission path between the device and the transmission network or a further transmission network and is connected to the second switching input, with an electrically conductive terminal connecting path which is used for connecting a terminal and is connected to the switching output, with a call signal detection unit which is coupled at the input side to the second connecting path. The call signal detection unit has an output and generates an output signal at the output as a function of the occurrence of a call signal, intended for the terminal, on the second connecting path, with a control unit which is connected at the input side to the output of the call signal detection unit and has an output at which an output signal is generated as a function of the signals applied at the input side, and with an electrically conductive connection which is located between the output of the control unit and the control input of the switchover unit.

Detection of the call signal, in particular on an analog user line, may be achieved with straightforward circuitry. In particular standard circuits are available. When detecting the call signal the switchover unit can be switched over in order, for example, to switch over from a basic state, in which the first transmission path is connected to the terminal, into a different operating state, in which the second transmission path is connected to the terminal. Alternatively two call signal detection units may also be used to change the operating states, in particular if the additional call signal detection unit is also used for a different purpose. However there are also other possibilities for blocking switching over or switching back.

The call signal is for example a call alternating voltage. The call signal may, however, also be a connection request in a data packet or in a digital transmission channel for establishing a connection at a higher protocol level.

The switchover unit allows automatic switching over of the terminal between the two connecting paths, so that the burden on the user is eased. The user friendliness is increased further by use of just one terminal.

Apart from switching over between conventional telephone connection and internet connection or internet protocol connection, there are numerous additional applications in a company network, for example switching over between two conventional user connections for using two call numbers with only one telephone.

In one development the device contains a first detection unit which is coupled at the input side to the first connecting path, has an output and generates an output signal at the output as a function of a signal detected at the input side and which indicates the connection state of the first connecting path. The device also contains a second detection unit which is coupled at the input side to the second connecting path, has an output and generates an output signal at the output as a function of a signal detected at the input side which indicates the connection state of the second connecting path. The control unit is electrically conductively connected at the input side to the output of the first detection unit and to the output of the second detection unit. The detection units make it possible to easily control the switchover unit in such a way that switching over is blocked if there is a connection on one transmission path. Detection of the connection state on the connecting paths also makes it easily possible in the device according to the invention to switch back to a basic state again once a call is ended.

The connecting paths may also contain further units, for example further detection units. In connection with the invention "connected" primarily means an electrically conductive connection. The transmission paths are for example wire lines, in particular two-wire lines, radio links, or light transmission links, in particular optical fiber (infrared). Both transmission paths are either of the same type or of different types.

In one development of the device according to the invention the first connecting path, the second connecting path and the terminal connecting path each contain exactly two electrically conductive lines. This results in a particularly simple connection. The lines are in particular a/b lines on which voice data may be transmitted particularly easily. Signaling may also be carried out easily on this type of line.

In a further development there is a terminal connection unit on the device which is connected to the terminal connecting path and is part of a two-part plug-in connection or snap-in connection, there preferably being only a single terminal connection unit on the device. The construction of the device is consequently simple. Alternatively or additionally there is a network-side first connection unit or a network-side second connection unit on the device which is connected to the first connecting path and is part of a two-part, easily releasable and producible plug-in connection or snap-in connection. In one embodiment there are only two network-side connection units on the device, so the device can be constructed with a few components, for example with less than thirty components.

In one development the first detection unit and/or the second detection unit are feed current detection units that each detect a feed current which is also used for feeding the terminal. A current may be detected particularly easily, so no complex sensors have to be used. The feed current detection units are also available as integrated components, in particular as individual circuits or as a component of a circuit.

In one development the call detection unit detects a call alternating current or a call alternating voltage. The call signal detection unit allows switching over to the connecting path that is not selected in a basic state.

In a further development the control unit contains an OR logic unit which carries out a logic OR operation of signals supplied at the input side and outputs an output signal at an output as a function of the logic result. The control unit also contains an AND logic unit which carries out a logic AND operation of signals supplied at the input side. The control unit therefore contains only simple logic circuits and in particular does not contain a processor which processes commands that would have to be stored in a storage unit. In one embodiment, apart from inverters, the control unit does not contain any further units. In a next embodiment the device does not contain any further control units either, so the construction of the device is particularly simple. The device is in particular constructed so as to be separate from the terminal, so existing terminals can be connected to the device without alteration.

In a next development the switchover unit is a bidirectional switchover unit, preferably a relay or a circuit consisting of one or more switching transistor(s). The bidirectional switchover unit allows voice transmission in two mutually opposed transmission directions.

In a next development the device has an idle state in which the first connecting path and the terminal connecting path are connected to each other. The idle state can be changed by a manually actuable switching unit such that the second connecting path and the terminal connecting path are connected to each other in the idle state. The user friendliness of the device is further enhanced as a result of the manually actuable switching unit because the user can change the basic state without unplugging and replugging connection lines.

The simple construction of the device is expressed in particular by:

a voltage supply unit which is fed via the first connecting path and/or the second connecting path, so no batteries or additional mains connections are required, a volume encompassed by the device of less than 100 cubic centimeters or less than 50 cubic centimeters, i.e. less than the volume of a cigarette packet, and a small number of components, such as resistors, capacitors, coils and transistors, in the device. The number of integrated or even discrete components is less than 30 or less than 20, in particular if components for protecting the circuit and for securing the power supply are not included.

The invention also relates to the use of the device for operating an analog telephone unit at an analog connection and an internet connection. The technical effects stated above for the device and its developments thereby also apply to the use. In particular analog connection and internet connection take place via the same two-wire line or two-wire lines that are different from each other.

The invention also relates to a method for switching over an analog telephone, comprising the following steps:
detecting the connection state on a first connecting path,
detecting the connection state on a second connecting path,
detecting a call signal on the second connecting path,
as a function of the result of detection, controlling or actuating a switchover unit which connects the first connecting path to the analog telephone or the second connecting path to the analog telephone in a complementary manner.

In a development the connecting state on the first connecting path and the connecting state on the second connecting path are detected simultaneously to avoid interference by incoming calls when the terminal is occupied.

BRIEF DESCRIPTION OF THE DRAWINGS

Exemplary embodiments of the invention will be described hereinafter with reference to the accompanying drawings, in which:

FIG. 1 shows a device arrangement for operating an analog telephone at an analog user connection and an internet connection.

DETAILED DESCRIPTION OF INVENTION

FIG. 1 shows a device arrangement 10 for operating an analog telephone 12 at an analog user connection and an internet connection. The telephone 12 is an analog telephone in which, in the exemplary embodiment, there is no digital voice processing. All voice signals are transmitted by the telephone 12 with analog voltage values. The telephone 12 is also fed via its connection lines.

Apart from the telephone 12 the device arrangement 10 contains:
what is known as a splitter unit 14,
optionally a telecommunications system 16,
a series connection unit 18,
a DSL modem 20 (DSL—Digital Subscriber Line) and
a VoIP adapter 22.

The splitter unit 14 separates a lower frequency band from an upper frequency band. With ISDN the transmission path for an analog or digital telephone user connection is in the lower frequency band, for example from 0 kilohertz to 4 kilohertz or from 0 kilohertz to 128. The transmission path for an internet connection with the aid of a DSL method, for example ADSL (Asymmetric DSL), SDSL (Symmetric DSL) or VDSL (Very High Speed DSL) is in the upper frequency band of for example 32 kilohertz or 150 kilohertz up to a megahertz or higher.

The telecommunications system 16 is an ISDN system (Integrated Services Digital Network) or a simple ISDN network termination (NT) with additional analog connection.

The series connection unit 18 produces the switchover between the telephone user connection and the internet connection. The design and mode of operation of the series connection unit 18 will be described in more detail hereinafter.

The DSL modem 20 demodulates analog signals issuing from the internet connection and generates digital signals therefrom. In the other transmission direction the modem 20 modulates a carrier signal or a plurality of carrier signals according to predefined digital signals which, in particular, contain digital voice signals.

The VoIP adapter 22 processes data which are assembled for example according to IP (Internet Protocol) according to the requirements of the relevant transmission protocol, the protocol RTP (Real Time Protocol) being used for transmission in particular in the case of voice transmission. The VoIP adapter 22 also executes a digital-analog conversion of the voice data and outputs it at an analog connection. Signaling for an analogue connection is also generated by the VoIP adapter 22 as a function of data from the internet. In the other direction the VoIP adapter 22 executes an analog-digital conversion of analog voice data into digital voice data. The digital voice data is routed in data packets according to internet protocol.

The splitter unit 14, the ISDN system 16, the DSL modem 20 and the VoIP adapter are units which are commercially available individually or in combination.

A connecting line 30 leads from a switching center (not shown) to an input of the splitter unit 14. The connecting line 30 is for example a two-wire line which is part of a transmission path of the telephone connection and part of a transmission path of the internet connection, the two transmission paths being formed by two different frequency bands.

An output of the splitter unit 14 is connected by a connection line 32 to the input of the ISDN system 16. The connection line 32 is part of a transmission path of the telephone connection. The connection line is for example a two-wire line which produces what is known as a U-interface.

The analog output of the ISDN system 16 is connected by a connecting line 34 to a connection 36 of the series connection unit 18. The connecting line 34 is a two-wire line which is also called an a/b line.

The connection 36 is for example a socket, so a connector is secured to the connecting line 34. Alternatively the connection 36 is a connector, a socket being secured to the connecting line 34. In another exemplary embodiment there is no ISDN system, so the connecting line 34 leads directly from the output of the splitter unit 14 to the connection 36.

A terminal connection 38 of the series connection unit 18 is connected to a connecting line 40 which leads to the telephone 12. The connecting line 40 is also a two-wire line which forms an a/b interface.

A further output of the splitter unit 14 is connected by a connecting line 42 to the input of the modem 20. The connecting line 44 is part of the transmission path for the internet connection.

The output of the modem 20 is connected by a connecting line 44 to the input of the VoIP adapter 22. The connecting line 44 is a data line, for example an Ethernet data line.

The output of the VoIP adapter 22 is connected by a connecting line 45 to a connection 50 of the series connection unit 18. The connecting line 45 is a two-wire line for analog voice transmission, i.e. an a/b line.

The series connection unit 18 contains:
a feed current detection unit 60,
a feed current detection unit 62.
a call signal detection unit 64,
a control unit 65 which in turn contains:
    an OR logic unit 66,
    an AND logic unit 68, and
    an inverter 70,
a relay 80.

The feed current detection unit 60 detects the current on the connecting line 90 and thereby also on the connecting lines 45 and 92. The feed current detection unit 60 contains for example a resistor inserted into a line of the connecting line 90. The electrical voltage, which drops across the resistor, is a measure of the current flow and can be used to switch a transistor.

The feed current detection unit 62 detects the current through the connecting line 100. In the exemplary embodiment the feed current detection unit 62 has the same construction as the feed current detection unit 60.

The call signal detection unit 64 is used for detecting a call signal on the connecting line 100, for example a call alternating voltage. The construction of a call signal detection unit is known for example from an analog answering machine.

The control unit 65 is used for controlling the switchover processes. The OR logic unit 66 contained in the control unit 65 carries out a logic operation of its input signals according to the logic OR function, i.e. as soon as a signal logic one is applied the output also has the signal logic one. The AND logic unit 68 that is also provided in the control unit 65 by contrast carries out a logic AND operation of its input signals, so there is only a signal logic one at the output of the AND logic unit 68 if there is a signal logic one at all its inputs; otherwise the signal logic zero is applied at the output.

The inverter 70 carries out a logic negation of the signal at its input and outputs the result at its output. The relay 80 contains a changeover switch 82 and a winding.

A connecting line 90 leads from the connection 50 to the feed current detection unit 60. A connecting line 92 leads from the feed current detection unit 60 to a break contact of the changeover switch 82. A connecting line 94 is permanently connected to the changeover switch 82. The connecting lines 92 and 94 are therefore connected in the idle state or in the voltage-free state of the relay 80.

A connecting line 96 leads from the output of the feed current detection unit 60 to the input of the inverter 70. The output of the inverter 70 is connected to an upper input of the AND logic unit 68.

A connecting line 100 leads from the connection 36 to the feed current detection unit 62. The feed current detection unit 62 is also connected to a connecting line 102 which leads to the call signal detection unit 64. A connecting line 104 leads from the call signal detection unit 64 to a make contact with the relay 80.

The connecting lines 90, 92, 94, 100, 102, 104 each contain two lines, in particular two strip conductors of a printed circuit board or two strip conductors of an integrated circuit arrangement.

A connecting line 106 leads from the output of the feed current detection unit 62 to an upper input of the OR logic unit 66. A connecting line 108 leads from the output of the call signal detection unit 62 to a lower input of the OR logic unit 66. The output of the OR logic unit 66 is connected by a connecting line 110 to a lower input of the AND logic unit 68. The output of the AND logic unit 68 is connected to the winding of the relay 80 by a connecting line 112.

In the exemplary embodiment the series connection unit 18 contains another voltage supply unit (not shown) which supplies the feed current detection units 60, 62, the call signal detection unit 64, the logic units 66 and 68 and the switchover unit with an operating voltage which, for example, is generated from a voltage which comes from the telephone network. The series connection unit 18 does not contain any further units apart from the units illustrated in FIG. 1 and the voltage supply unit. In another exemplary embodiment the voltage supply unit contains a battery.

The mode of operation of the series connection unit 18 will be described in more detail hereinafter. Scenarios I to IV will be discussed.

I) Outgoing call via the VoIP address, i.e. the connecting line 45:
a) 40 volts for example, which are generated by the VoIP adapter 22, are applied to the connecting line 45 to simulate the function of a switching center,
b) an electric circuit between the connecting lines 45 is broken for example by a hook switch when the receiver is replaced, so no direct current flows through the connecting line and there is a signal logic zero on the connecting line 96 or a signal logic one at the upper input of the AND logic unit 68 owing to inversion by the inverter 70,
c) the telephone receiver of the telephone 12 is lifted, whereupon an electric circuit between the two connection lines 45 is closed, so the current detection unit 60 detects a current, for example a current of 20 milliamps, so a signal logic one is applied to the connecting line 96,
d) at the output of the inverter 70 and therefore at the input of the AND logic unit 68, there is a signal logic zero, so the relay 80 can no longer be switched from the idle state, and in particular cannot be switched by a call arriving at the analog user connection or the connecting line 34 or by the switching on or off of the call voltage on the connecting line 34 either,
e) the user of telephone 12 makes a call and at the end of the call replaces the receiver of the telephone 12 again, whereby the electric circuit between the two connecting lines 45 is broken again, so the current detection unit 60 does not detect any more current and there is a signal logic one at the upper input of the AND logic unit 70 again. The basic state is thereby established again.

II) Incoming call via the VoIP connection, i.e. connecting line 45:
the above-stated steps a) to e) apply, with a step b1) being inserted between steps b) and c), in which a call alternating voltage is applied by the VoIP adapter 22 to simulate the function of an analog switching center,
the call alternating voltage can arrive unhindered via the relay 80 that is in the idle position at the telephone 12 at which a ring tone sounds which leads to step c).

A scenario III in which the call set-up is initiated by the telephone 12 via the telephone connection or the connecting line 34 is not possible in the first exemplary embodiment.

IV) Incoming call via the connecting line 34 (telephone connection). A signal logic zero on connecting line 96, owing to inversion by the inverter 70, leads to signal logic one at the upper input of the AND logic unit 68. Switching of the relay 80 thereby depends on the signals on the connecting lines 106 and 108. The following processes are thereby possible when a connection request arrives via the analog user connection, i.e. via the connecting line 34:
a) 40 volts for example, which are generated by a switching center or an analog connection of the telecommunications system 16, are applied to the connecting line 34,
b) an electric circuit between the two connecting lines 34 is already broken by the relay 80 in the idle position, so no current flows and there is a signal logic zero on the connecting line 106 or on the upper input of the OR logic unit 66. At first there is no call signal either, so the call signal detection unit 64 does not detect a call signal and generates a signal logic zero on the connecting line 108 or at the lower input of the OR logic unit 66. The output of the OR logic unit 66 and the AND logic unit 68 is also at logic zero. The relay 80 is consequently in the idle state.
b1) the switching center or the telecommunications system 16 generates a call signal on the connecting line 34 and thereby on connecting lines 100, 102, 104 as well, for example by applying a comparatively high alternating voltage of for example 80 volts,
b2) the call signal detection unit 64 detects the call signal and generates a signal logic one on the connecting line 108 or at the lower input of the OR logic unit 66 which leads to the signal logic one at the output of the OR logic unit 66. Two signals logic one are accordingly at the input of the AND logic unit 68, so logic one is also at the output of the AND logic unit 68 and the relay 80 switches,
b3) the connecting lines 104 and 94 are connected owing to actuation of the relay 80, so the call signal is also applied at the telephone 12 and is audibly output.
c) the receiver of the telephone 12 is lifted, whereupon an electric circuit between the two connecting lines 34 is closed, so the current detection unit 62 detects a current, for example a current of 20 milliamps, so there is a signal logic one on the connecting line 106. Once the call voltage and the signal logic one associated therewith on the connecting line 108 is switched off this signal leads to locking of the relay 80, i.e. the relay 80 remains actuated,
d) no switching processes are triggered by a call arriving on the connecting line 45 because the call signal on the connecting line 45, 92 is not detected and an electric circuit between the two connecting lines 45 is not closed by establishment of the call signal alone,
e) the user makes a call and at the end of the call replaces the receiver of the telephone 12 again, whereby the electric circuit between the two connecting lines 34 is broken again, so the current detection unit 62 does not detect any more current and there is a signal logic zero at the upper input of the OR logic unit 66 again. Since there is a signal logic zero at the two inputs of the OR logic unit 66 there is also a signal logic zero at the output of the OR logic unit 66 and this leads to the relay 80 being switched off by the AND logic unit. The basic state is thereby established again.

In a further exemplary embodiment the series connection unit 18 contains a manually actuable changeover switch 120 with which the relay 80 can be manually switched over in such a way that in the idle state of the relay the connecting lines 94 and 112 are connected. Scenario III is thereby also possible, i.e. routing of an outgoing call via the connecting line 34.

In a next exemplary embodiment the DSL modem 20 is connected to a connecting line 122 which is part of an internet connection which is not coupled to an analog or digital telephone connection. In this case the splitter 14 and the connecting line 42 are omitted. The connecting line 30 is then for example a simple ISDN connection or an analog connection if no telecommunications system 16 is provided.

The AND logic function was produced in the exemplary embodiment with an AND gate. A NAND gate is alternatively used however. The OR logic function may also be produced by an OR gate, by a NOR gate or in some other way.

To summarize: the invention makes it possible inter alia to easily use VoIP services and conventional telephone connections using one and the same telephone without unplugging and replugging a telephone connecting line. The invention proposes a series connection unit 18 for alternate operation of an analog telephone 12 at two user connections. The series connection unit 18 is inserted between the connecting lines 45, 34 and the telephone 12 and switches between the lines 45, 34 as required. One connection—expediently the VoIP connection—is preferred in this connection for outgoing calls, while both connections are equal for incoming calls. The switchover preferably takes place in a hard manner, for example via a relay 80, because the telephone should be connected to only one connection. The second connection could be a POTS user connection or an analog port of an ISDN telecommunications system.

In the basic state the telephone 12 is connected to the preferred connection and outgoing calls for this connection may be established or incoming calls accepted at any time. A call set-up via the second connection is not readily possible, i.e. without changing the basic state. Only by using the changeover switch 120 can the basic state be bridged. A call recognition takes place for the second connection and this allows switching over to the second connection if no call is being conducted on the preferred connection. This may be checked for example by feed current detection or recognition. If after call signaling there is a call set-up via the second connection, the switchover is retained until the end of the call. The end of the call may again be determined for example by feed current detection.

A call-waiting function may moreover be achieved by way of passive overcoupling of the call signals of two connections. By adding an additional call signal recognition at the preferred connection and using a visual/acoustic indicator call signals may also be displayed during a call via the other connection line. The user can then decide whether he ends the current call and then accepts the call arriving on the other transmission path.

The invention claimed is:

1. A device for switching over a telecommunication terminal, the device including a switchover unit, comprising:

a control input, a first switching input, a second switching input, and a switching output, the switchover unit switching an electrically conductive connection between the first switching input and the switching output or between the second switching input and the switching output as a function of a signal at the control input;

a first connecting path connecting a first transmission path between the device and a transmission network, the first connecting path connected to the first switching input;

a second connection path connecting a second transmission path between the device and the transmission network or a further transmission network, the second connection path connected to the second switching input;

an electrically conductive terminal connecting path connecting a terminal and the switching output;

a call signal detection unit having an input coupled to the second connecting path, the call signal detection unit including an output and generating an output signal at the output as a function of an occurrence of a call signal, intended for the terminal, on the second connecting path;

a control unit having an input coupled to the output of the call signal detection unit, the control unit including an output at which an output signal is generated as a function of a signal applied to the input of the control unit;

a connection located between the output of the control unit and the control input of the switchover unit;

a first detection unit having input coupled to the first connecting path, the first detection unit having an output and generating an output signal at the output of the first detection unit as a function of a signal detected at the input of the first detection unit, the signal detected at the input of the first detection unit indicating a connection state of the first connecting path; and a second detection unit having an input coupled to the second connecting path, the second detection unit having an output and generating an output signal at the output of the second detection unit as a function of a signal detected at the input of the second detection unit, the signal detected at the input of the second detection unit indicating a connection state of the second connecting path;

wherein the input of the control unit is connected to the output of the first detection unit and to the output of the second detection unit;

wherein the control unit includes an OR logic unit that has a plurality of inputs and that carries out a logic OR operation of signals supplied at the plurality of inputs of the OR logic unit, the OR logic unit has an output that outputs an output signal as a function of a result of the logic OR operation;

wherein the output of the second detection unit is connected to one of the plurality of inputs of the OR logic unit;

wherein the output of the call signal detection unit is connected to a further one of the plurality of inputs of the OR logic unit;

wherein the control unit includes an AND logic unit that has a plurality of inputs and an output and that carries out a logic AND operation of signals supplied at the plurality of inputs of the AND logic unit;

wherein the OR logic unit has an output that is connected to one of the plurality of inputs of the AND logic unit;

wherein the output of the first detection unit is coupled to a further one of the plurality of inputs of the AND logic unit; and wherein the output of the AND logic unit is connected to the output of the control unit.

2. The device as claimed in claim 1, wherein the first and the second transmission networks are the same network.

3. The device as claimed in claim 1, wherein the first connecting path, the second connecting path, and the terminal connecting path each contain exactly two electrically conductive lines.

4. The device as claimed in claim 1, further comprising:
a terminal connection unit connected to the terminal connecting path, the terminal connection unit being part of a plug-in connection or snap-in connection,
a network-side first connection unit connected to the first connecting path, the network-side first connection unit being part of the plug-in connection or snap-in connection; and
a network-side second connection unit connected to the second connecting path, the network-side first connection unit being part of the plug-in connection or snap-in connection.

5. The device as claimed in claim 4, wherein there is exactly one terminal connection unit and wherein there is exactly two network side connection units.

6. The device as claimed in claim 1, wherein the first detection unit is a feed current detection unit that detects feed current also used for feeding the terminal or wherein the second detection unit is a feed detection unit that detects feed current also used for feeding the terminal.

7. The device as claimed in claim 1, wherein the first detection unit is a feed current detection unit that detects feed current also used for feeding the terminal and wherein the second detection unit is a feed detection unit that detects feed current also used for feeding the terminal.

8. The device as claimed in claim 1,
wherein the call detection unit detects a call alternating current or a call alternating voltage, and
wherein there is no call detection unit coupled to the first connecting path.

9. The device as claimed in claim 1, wherein the switchover unit is a bidirectional switchover unit.

10. The device as claimed in claim 9, wherein the switchover unit is a relay.

11. The device as claimed in claim 1,
wherein the device includes an idle state in which the first connecting path and the terminal connecting path (94) are connected to each other,
wherein the device includes a manually actuable switching unit with which the idle state is predetermined in which the second connecting path and the terminal connecting path are connected to each other.

12. The device as claimed in claim 1, wherein at least one of the following features exists:
the device contains a voltage supply unit that is fed via the first connecting path,
the device contains a voltage supply unit that is fed via the second connecting path,
the volume encompassed by the device is less than 100 cubic centimeters, and
the number of resistors, capacitors, coils or transistors in the device is less than 30.

13. The device as claimed in claim 1, wherein terminal is an analog telephone unit and the device operates the analog telephone unit at an analog connection and an internet connection.

14. The device as claimed in claim 13, wherein the analog connection and the internet connection use the same two-wire line.

15. The device as claimed in claim 13, wherein the analog connection and the internet connection use different two-wire lines.

16. A method for switching over an analog telephone, comprising:
providing a device for switching over an analog telephone, the device including a switchover unit, comprising:
a control input, a first switching input, a second switching input, and a switching output, the switchover unit switching an electrically conductive connection between the first switching input and the switching output or between the second switching input and the switching output as a function of a signal at the control input,
a first connecting path connecting a first transmission path between the device and a transmission network, the first connecting path connected to the first switching input,
a second connection path connecting a second transmission path between the device and the transmission network or a further transmission network, the second connection path connected to the second switching input,
an electrically conductive terminal connecting path connecting a terminal and the switching output,
a call signal detection unit having an input coupled to the second connecting path, the call signal detection unit including an output and generating an output signal at the output as a function of an occurrence of a call signal, intended for the terminal, on the second connecting path,
a control unit having an input coupled to the output of the call signal detection unit, the control unit including an output at which an output signal is generated as a function of a signal applied to the input of the control unit,
a connection located between the output of the control unit and the control input of the switchover unit,
a first detection unit having input coupled to the first connecting path, the first detection unit having an output and generating an output signal at the output of the first detection unit as a function of a signal detected at the input of the first detection unit, the signal detected at the input of the first detection unit indicating a connection state of the first connecting path, and
a second detection unit having an input coupled to the second connecting path, the second detection unit having an output and generating an output signal at the output of the second detection unit as a function of a signal detected at the input of the second detection unit, the signal detected at the input of the second detection unit indicating a connection state of the second connecting path,
wherein the input of the control unit is connected to the output of the first detection unit and to the output of the second detection unit,
wherein the control unit includes an OR logic unit that has a plurality of inputs and that carries out a logic OR operation of signals supplied at the plurality of inputs of the OR logic unit, the OR logic unit has an output that outputs an output signal as a function of a result of the logic OR operation,
wherein the output of the second detection unit is connected to one of the plurality of inputs of the OR logic unit,
wherein the output of the call signal detection unit is connected to a further one of the plurality of inputs of the OR logic unit, wherein the control unit includes an AND logic unit that has a plurality of inputs and an output and that carries out a logic AND operation of signals supplied at the plurality of inputs of the AND logic unit, wherein the OR logic unit has an output that is connected to one of the plurality of inputs of the AND logic unit, wherein the output of the first detection unit is coupled to a further one of the plurality of inputs of the AND logic unit, and wherein the output of the AND logic unit is connected to the output of the control unit; and based on the signal detected at the input of the first detection unit and on the signal detected at the input of the second detection unit, controlling the switchover unit to connect the first connecting path to the analog telephone or to connect the second connecting path to the analog telephone in a complementary manner.

17. The method as claimed in claim 16, wherein the connection state on the first connecting path is detected at the same time as the connection state on the second connecting path.

* * * * *